S. M. SCOTT.
FEED DELIVERING ATTACHMENT FOR SILOS.
APPLICATION FILED OCT. 14, 1912.
1,068,176.
Patented July 22, 1913.
2 SHEETS—SHEET 1.
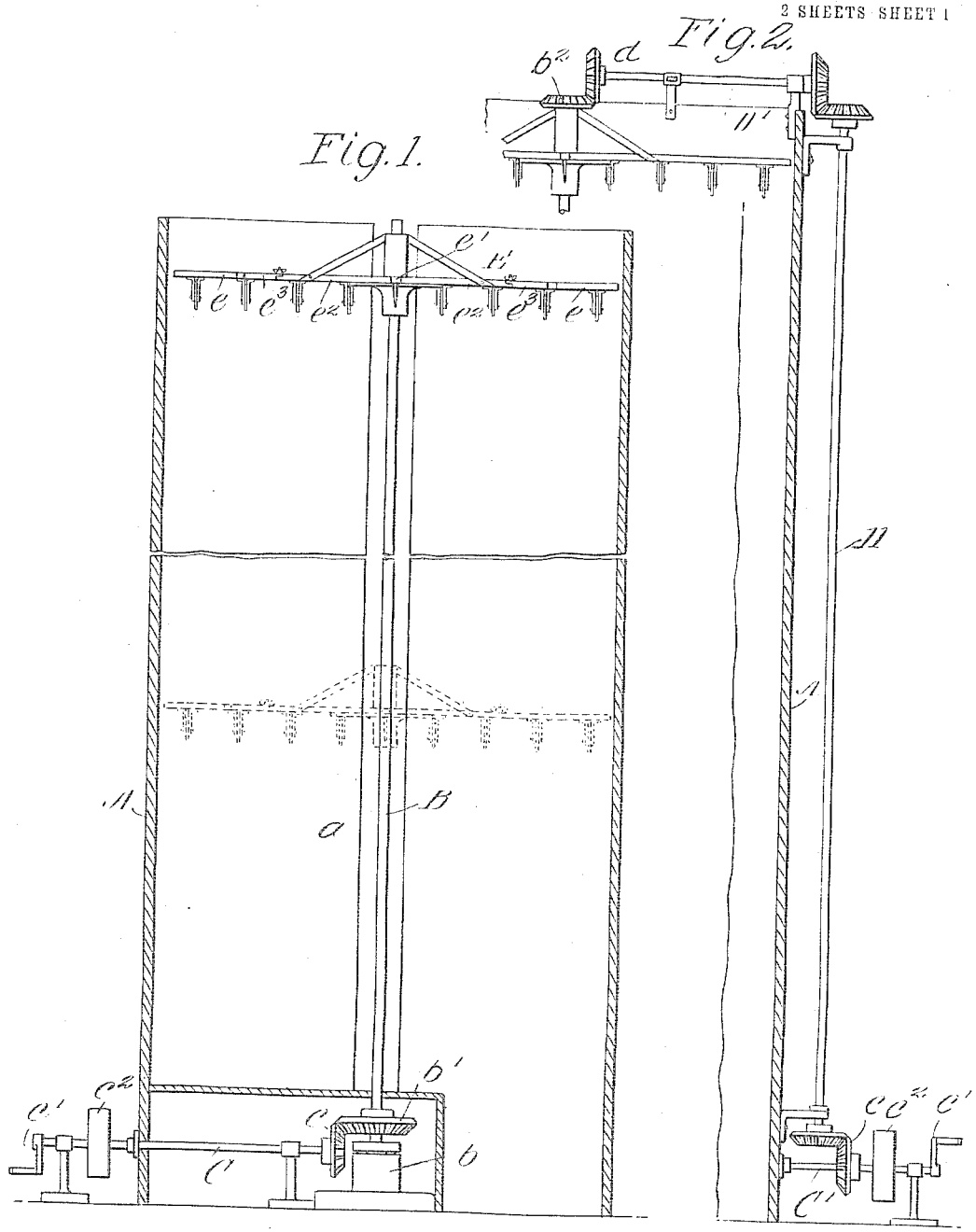
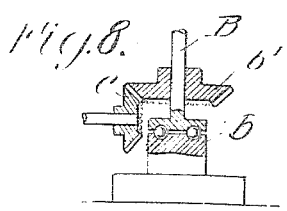
WITNESSES
INVENTOR
STEPHEN M. SCOTT
BY
ATTORNEYS S. M. SCOTT.
FEED DELIVERING ATTACHMENT FOR SILOS.
APPLICATION FILED OCT. 14, 1912.
1,068,176.
Patented July 22, 1913.
2 SHEETS—SHEET 2.
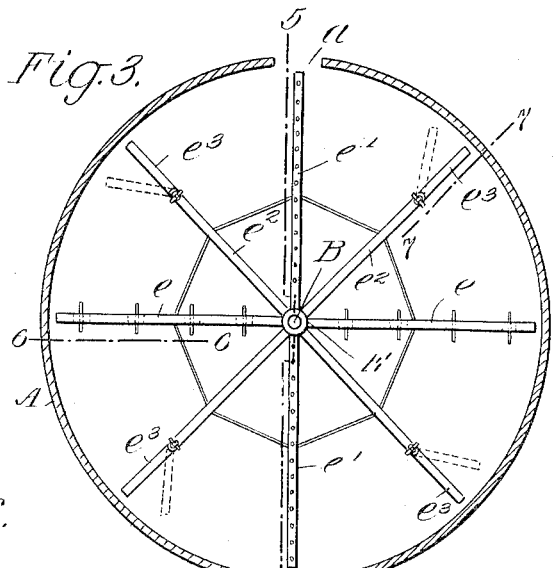
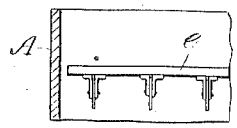
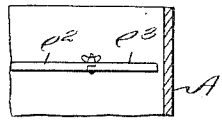
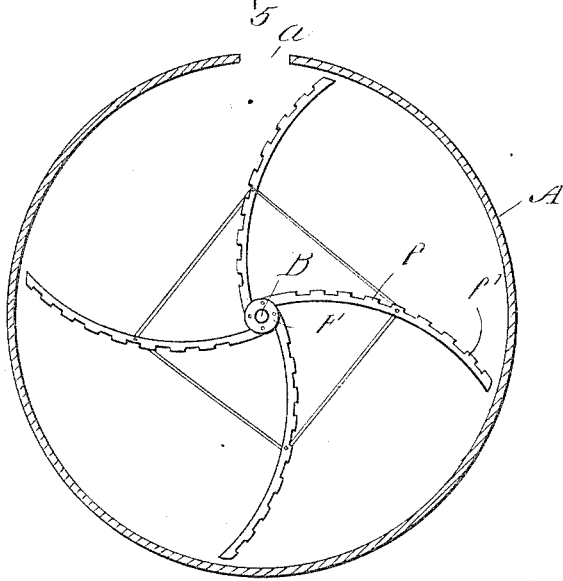
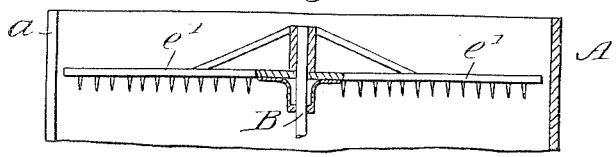
WITNESSES
INVENTOR
STEPHEN M. SCOTT
BY
ATTORNEYS

UNITED STATES PATENT OFFICE.

STEPHEN M. SCOTT, OF EDNA, TEXAS.

FEED-DELIVERING ATTACHMENT FOR SILOS.

1,068,176.   Specification of Letters Patent.   Patented July 22, 1913.

Application filed October 14, 1912. Serial No. 725,650.

*To all whom it may concern:*

Be it known that I, STEPHEN M. SCOTT, a citizen of the United States, and a resident of Edna, in the county of Jackson and State of Texas, have made certain new and useful Improvements in Feed-Delivering Attachments for Silos, of which the following is a specification.

The present invention relates to silos, particularly to an attachment whereby the ensilage may be delivered therefrom as it is desired for use without necessitating the climbing of the silo and entrance thereinto for this purpose.

Broadly my invention consists in providing a silo with a feed delivering frame which is rotatable therein above and upon the packed ensilage, this frame embodying outstanding arms which during the rotation of the frame serve to force the feed through the usual vertical longitudinal door opening, means being provided to rotate and support the frame in such a manner as to permit of its vertical movement for a purpose which will be at once apparent.

In the accompanying drawings which illustrate my invention, Figure 1 is a vertical longitudinal section thereof through a silo provided with my improvements. Fig. 2 is a similar view on a slightly enlarged scale of a portion of the silo only, illustrating a slightly modified form of my invention. Fig. 3 is a transverse sectional view illustrating my improved delivering frame for use in connection with the usual fodder ensilage. Fig. 4 is a similar view illustrating the delivering frame for use in connection with grain. Fig. 5 is a detail cross section through the frame illustrated in Fig. 3 and taken substantially on the line 5—5 thereof. Fig. 6 is a detail sectional view taken substantially on the line 6—6 of Fig. 3, and Fig. 7 is a similar view taken substantially on the line 7—7 of Fig. 3. Fig. 8 is a detail vertical section taken through the lower end of the upright shaft shown in Fig. 1, adjacent and including its mounting and connection with the horizontal driven shaft.

Referring to the figures, particularly to Fig. 1, A indicates the usual silo having a vertical longitudinal door opening $a$ which is ordinarily closed by door sections arranged in superposed relation. Silos of this type are usually provided with a ladder structure on the side which it is necessary to climb in order to get into the silo for the purpose of throwing out the required feed. In order to obviate this difficulty which requires considerable time and is attended by considerable danger, I provide a vertical shaft B which is mounted centrally within the silo as clearly shown by comparison of Figs. 1, 3 and 4, the lower end of this shaft being supported by a roller bearing seen at $b$. The shaft B receives its rotation from a driven shaft C which may either extend partially within the silo and be directly connected to the shaft B through bevel gears $c$ and $b'$, or which may extend wholly upon the outside of the silo as indicated in Fig. 2, the driven shaft being clearly indicated by C' and being in this form of my invention connected to the vertical shaft B by intermediate shafts D and D', both of which are provided with bevel gears therein, and the whole of which is connected by bevel gears $d$ and $b^2$ arranged at the upper end of the shaft B. In either case, the driven shaft C C' is provided both with a crank handle $c'$ and a pulley $c^2$, the former being for use where hand power is employed and the latter for use where an internal combustion engine or other motor is available. Splined in any suitable manner upon the shaft and movable thereon so as to rest upon the surface of the ensilage is a frame which may be either of the form shown in Fig. 3 for use in delivering fodder and like feed from the silo, or which may be of the kind indicated in Fig. 4 where grain is to be delivered.

The frame E as shown in Fig. 3 embodies outstanding arms $e$ and raking arms $e'$, the former being provided with a series of cutting rollers journaled in brackets upon their under surfaces as particularly indicated in Fig. 6, and the latter being provided with depending rake teeth as particularly indicated in Fig. 5. Thus in the rotation of the frame E through the connections before described, the surface of the ensilage will be cut by the rollers carried by arms $e$ and the surface of the ensilage thus cut will be readily freed for delivery through the door opening of the silo, by means of the raking arms $e$. The actual delivery of the ensilage is effected by the arms $e^2$ which outstand from the hub of the frame between the several arms $e$, $e'$, these arms $e^2$ being provided with angularly movable outer portions $e^3$ as clearly indicated by reference to Figs. 3 and 7 and which angularly movable portions may be locked in the desired adjustment by the thumb screw connection as shown. In this manner the delivery arms $e^2$ may be adjusted so as to effectively deliver the loose ensilage through the door opening as desired.

The delivery frame F for use in connection with silos containing grain, and as particularly shown in Fig. 4, consists wholly in the curved radial outstanding delivery arms $f$, the cutting and raking arms being done away with in this form of the invention, in view of the fact that the grain is not packed in the manner of fodder and other green foods. It will be noted, however, that these arms $f$ are provided with outer portions $f'$ which are adjustable in a manner identical with the adjustment of the outer portions $e^3$ of the arms $e^2$, and being adapted to be secured in various degrees of angular adjustment. This structure enables the arms $f$ to effectively deliver grain through the door opening of the silo when the shaft B is rotated.

It will be noted that through its splined connection with the shaft B, the delivery frame of the particular style required is not only rotated but is permitted to move downwardly upon the shaft as such movement is required in order to rest directly on the ensilage at all times. It will be further noted that with either form of gearing as shown, and in fact with various other forms of gearing, my invention will obviate personal entrance into the silo for the purpose of delivering feed therefrom and will therefore do away with the loss of considerable time and the danger incident to ascending and descending the ladder usually employed for that purpose.

I claim;

1. The combination of a silo provided with the usual door opening, of a feed delivering frame rotatable therein above and adapted to bear upon, the ensilage therein, and embodying outstanding feed delivering arms certain of which have jointed outer portions which are movable to selected angles, and means for rotating and supporting the frame and permitting of its vertical movement for the purpose described.

2. The combination of a silo provided with the usual door opening, of a feed delivering frame rotatable therein above, and adapted to bear upon, the ensilage therein, said frame embodying a plurality of radial, outstanding arms, certain of which are provided with ensilage cutters, certain others of which are provided with teeth adapted to loosen the cut ensilage, and certain others of which are provided with jointed outer portions which are movable to selected angles and adapted to deliver the cut and loosened ensilage through the door opening, and means for rotating and supporting the frame and permitting of its vertical movement for the purpose described.

3. The combination of a substantially cylindrical container for holding ensilage and having a vertical side opening through its wall, a feed delivering frame rotatable in the container above, and adapted to bear upon, the ensilage therein, and embodying outstanding arms formed and adapted to force the ensilage outwardly through the side opening of the container wall, and means for rotating and supporting the frame, and permitting of its vertical movement for the purpose described.

STEPHEN M. SCOTT.

Witnesses:
J. H. CLEVELAND,
LOUISE BERGBREDE.